(12) United States Patent
Vajravel

(10) Patent No.: US 10,489,311 B1
(45) Date of Patent: Nov. 26, 2019

(54) MANAGING WEBUSB SUPPORT FOR LOCAL AND REDIRECTED USB DEVICES

(71) Applicant: Dell Products L.P., Round Rock, TX (US)

(72) Inventor: Gokul Thiruchengode Vajravel, Bengaluru (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/267,233

(22) Filed: Feb. 4, 2019

(51) Int. Cl.
| | | |
|---|---|---|
| G06F 13/10 | (2006.01) | |
| G06F 13/38 | (2006.01) | |
| H04L 29/08 | (2006.01) | |
| G06F 9/451 | (2018.01) | |
| G06F 9/4401 | (2018.01) | |
| G06F 3/06 | (2006.01) | |

(52) U.S. Cl.
CPC .......... G06F 13/102 (2013.01); G06F 9/4411 (2013.01); G06F 9/452 (2018.02); G06F 13/382 (2013.01); H04L 67/2814 (2013.01); G06F 2003/0697 (2013.01); G06F 2213/0042 (2013.01)

(58) Field of Classification Search
CPC ...... G06F 3/038; G06F 9/4411; G06F 9/4413; G06F 9/4415; G06F 9/452; G06F 13/10; G06F 13/102; G06F 13/382; G06F 2003/0697; G06F 2009/45579; G06F 2213/0042; H04L 67/2814
See application file for complete search history.

(56) References Cited

U.S. PATENT DOCUMENTS

| | | | | |
|---|---|---|---|---|
| 2013/0072260 | A1* | 3/2013 | Nair | G06F 13/102 455/566 |
| 2013/0083800 | A1* | 4/2013 | Lezama Bounine | H04L 12/2859 370/401 |
| 2013/0305263 | A1* | 11/2013 | Go | G06F 13/00 719/327 |

(Continued)

OTHER PUBLICATIONS

Grant, Reilly, et al. "WebUSB API". Editor's Draft. Web platform Incubator Community Group. Online Jan. 30, 2018. Retrieved from Internet Oct. 4, 2019. <https://web.archive.org/web/20180203093249/https://wicg.github.io/webusb> (Year: 2018).*

(Continued)

*Primary Examiner* — Thomas J. Cleary
(74) *Attorney, Agent, or Firm* — Kirton McConkie; Brian Tucker

(57) ABSTRACT

WebUSB access can be managed for local and redirected USB devices. To enable WebUSB access to a redirected USB device, the server-side agent can force the Winusb.sys function driver to be loaded on the device stack of the USB device by modifying the device's descriptors that are reported during enumeration. To enable WebUSB access to a local USB device, a hook driver can perform similar modifications during enumeration to thereby force the Winusb.sys function driver to be loaded as the function driver on the device stack. The agent or hook driver can also block WebUSB access to a USB device by removing the WebUSB platform capability descriptor during enumeration and/or by blocking requests to access the USB device that originate from a browser process.

20 Claims, 16 Drawing Sheets

(56) References Cited

U.S. PATENT DOCUMENTS

| | | | |
|---|---|---|---|
| 2016/0261461 A1* | 9/2016 | Vaananen | H04L 29/08 |
| 2018/0212817 A1* | 7/2018 | Vajravel | H04L 41/046 |
| 2018/0213063 A1* | 7/2018 | Vajravel | H04L 41/046 |
| 2018/0217764 A1* | 8/2018 | Vajravel | G06F 3/0607 |
| 2018/0232293 A1* | 8/2018 | Petrick | G06F 11/3051 |
| 2018/0234502 A1* | 8/2018 | Petrick | H04L 67/14 |

OTHER PUBLICATIONS

Tiwari, Aditya. "What is WebUSB? How It Helps Connecting USB Devices to the Web". Fossbytes Media Pvt. Ltd. Online Sep. 6, 2017. Retrieved from Internet Oct. 4, 2019. <https://fossbytes.com/webusb-api-connect-usb-devices-to-web-apps-browser> (Year: 2017).*

"Compatible ID". Microsoft. Online Apr. 19, 2017. Retrieved from Internet Oct. 4, 2019. <https://docs.microsoft.com/en-us/windows-hardware/drivers/install/compatible-ids>. (Year: 2017).*

* cited by examiner

MANAGING WEBUSB SUPPORT FOR LOCAL AND REDIRECTED USB DEVICES

CROSS-REFERENCE TO RELATED APPLICATIONS

N/A

BACKGROUND

The present invention is generally directed to USB device redirection in a virtual desktop infrastructure (VDI) environment. USB device redirection generally refers to making a USB device that is connected to a client accessible within a virtual desktop as if the USB device had been physically connected to the virtual desktop. In other words, when USB device redirection is implemented, a user can connect a USB device to his or her client terminal and the USB device will function as if it had been connected to the server.

FIGS. 1 and 2 and the following description will provide a general overview of how USB device redirection can be implemented. In FIG. 1, a computing system 100 is depicted as including a number of client terminals 102a-102n (referenced generally herein as client(s) 102) in communication with a server 104 via a network 106. Server 104 can be configured to support a remote session (e.g., a remote desktop session) wherein a user at a client 102 can remotely access applications and data at the server 104 from the client 102. Such a connection may be established using any of several well-known techniques such as the Remote Desktop Protocol (RDP) and the Citrix® Independent Computing Architecture (ICA).

Client terminal 102 may represent a computer, a mobile phone (e.g., smart phone), a laptop computer, a thin client terminal, a personal digital assistant (PDA), a portable computing terminal, or a suitable terminal or device with a processor. Server 104 may represent a computer, a laptop computer, a computing terminal, a virtual machine (e.g., VMware® Virtual Machine), a desktop session (e.g., Microsoft Terminal Server), a published application (e.g., Microsoft Terminal Server) or a suitable terminal with a processor.

Client 102 may initiate a remote session with server 104 by sending a request for remote access and credentials (e.g., login name and password) to server 104. If server 104 accepts the credentials from client 102, then server 104 may establish a remote session, which allows a user at client 102 to access applications and data at server 104. During the remote session, server 104 sends display data to client 102 over network 106, which may include display data of a desktop and/or one or more applications running on server 104. The desktop may include, for example, icons corresponding to different applications that can be launched on server 104. The display data allows client 102 to locally display the desktop and/or applications running on server 104.

During the remote session, client 102 may send user commands (e.g., inputted via a mouse or keyboard at client 102) to server 104 over network 106. Server 104 may process the user commands from client 102 similar to user commands received from an input device that is local to server 104. For example, if the user commands include mouse movements, then server 104 may move a pointer on the desktop running on server 104 accordingly. When the display data of the desktop and/or application changes in response to the user commands, server 104 sends the updated display data to client 102. Client 102 locally displays the updated display data so that the user at client 102 can view changes at server 104 in response to the user commands. Together, these aspects allow the user at client 102 to locally view and input commands to the desktop and/or application that is running remotely on server 104. From the perspective of the client, the desktop running on server 104 may represent a virtual desktop environment.

FIG. 2 is a block diagram of a local device virtualization system 200. System 200 may include client 102 in communication with server 104 over network 106 as illustrated in FIG. 1. Client 102 may include a proxy 210, a stub driver 220, and a bus driver 230. Client 102 can be connected to a device 240, as shown in FIG. 2. Server 104 may include an agent 250 and a virtual bus driver 260.

In accordance with USB device redirection techniques, while device 240 is not locally or physically connected to server 104 and is remote to server 104, device 240 appears to server 104 as if it is locally connected to server 104, as discussed further below. Thus, device 240 appears to server 104 as a virtual device 290.

By way of illustration and not limitation, device 240 may be any type of USB device including a machine-readable storage medium (e.g., flash storage device), a printer, a scanner, a camera, a facsimile machine, a phone, an audio device (e.g., a headset), a video device (e.g., a camera), a peripheral device, or other suitable device that can be connected to client 102. Device 240 may be an external device (i.e., external to client 102) or an internal device (i.e., internal to client 102). For purposes of this application, device 240 can represent an authentication device such as a smart card.

Bus driver 230 can be configured to allow the operating system and programs of client 102 to interact with device 240. In one aspect, when device 240 is connected to client 102 (e.g., plugged into a port of client 102), bus driver 230 may detect the presence of device 240 and read information regarding device 240 ("device information") from device 240. The device information may include features, characteristics and other information specific to device 240 such as a device descriptor (e.g., product ID, vendor ID and/or other information), a configuration descriptor, an interface descriptor, an endpoint descriptor and/or a string descriptor. Bus driver 230 may communicate with device 240 through a computer bus or other wired or wireless communications interface.

In accordance with USB device redirection techniques, device 240 may be accessed from server 104 as if the device were connected locally to server 240. Device 240 may be accessed from server 104 when client 102 is connected to server 104 through a remote session running on server 104. For example, device 240 may be accessible from the desktop running on server 104 (i.e., virtual desktop environment). To enable this, bus driver 230 may be configured to load stub driver 220 as the default driver for device 240. Stub driver 220 may be configured to report the presence of device 240 to proxy 210 and to provide the device information (e.g., device descriptor) to proxy 210. Proxy 210 may be configured to report the presence of device 240, along with the device information, to agent 250 of server 104 over network 106 (e.g., via a TCP or UDP socket). Thus, stub driver 220 redirects device 240 to server 104 via proxy 210.

Agent 250 may be configured to receive the report from proxy 210 that device 240 is connected to client 102 and the device information. Agent 250 may further be configured to associate with the report from proxy 210 one or more identifiers for client 102 and/or for a remote session through which client 102 is connected to server 104, such as a session number or a session locally unique identifier (LUID). Agent 250 can provide notification of device 240, along with the device information, to virtual bus driver 260. Virtual bus driver 260 (which may be a Dell Wyse TCX USB bus driver, or any other bus driver) may be configured to create and store in memory a record corresponding to device 240. This record may include at least part of the device information and session identifiers received from agent 250. Virtual bus driver 260 may be configured to report to operating system 170 of server 104 that device 240 is connected and to provide the device information to the operating system. This allows the operating system of server 104 to recognize the presence of device 240 even though device 240 is connected to client 102.

The operating system of server 104 may use the device information to find and load one or more appropriate device drivers for device 240 at server 104. Each driver may have an associated device object (object(s) 281a, 281b, . . . , 281n, referred to generally as device object(s) 281), as illustratively shown in FIG. 2. A device object 281 is a software implementation of a real device 240 or a virtualized (or conceptual) device 290. Different device objects 281 layer over each other to provide the complete functionality. The different device objects 281 are associated with different device drivers (driver(s) 282a, 282b, . . . 282n, referred to generally as device driver(s) 282). In an example, a device 240 such as a USB flash drive may have associated device objects including objects corresponding to a USB driver, a storage driver, a volume manager driver, and a file system driver for the device. The device objects 281 corresponding to a same device 240 form a layered device stack 280 for device 240. For example, for a USB device, a USB bus driver will create a device object 281a stating that a new device has been plugged in. Next, a plug-and-play (PNP) component of the operating system will search for and load the best driver for device 240, which will create another device object 281b that is layered over the previous device object 281a. The layering of device objects 281 will create device stack 280.

Device objects 281 may be stored in a memory of the server 104 associated with virtual bus driver 260. In particular, device objects 281 and resulting device stack 280 may be stored in random-access memory of server 104. Different devices 240/290 can have device stacks having different device objects and different numbers of device objects. The device stack may be ordered, such that lower level device objects (corresponding to lower level device drivers) have lower numbers than higher level device objects (corresponding to higher level device drivers). The device stack may be traversed downwards by traversing the stack from higher level objects to lower level objects. For example, in the case of an illustrative device stack 280 corresponding to a USB flash drive, the ordered device stack may be traversed downwards from a high-level file system driver device object, to a volume manager driver device object, to a storage driver device object, to a USB driver device object, and finally to a low-level virtual bus driver device object. Different device stacks 280 can be layered over each other to provide the functionality of the devices 240/290 inside devices, like USB Headsets, or USB pen drives. A USB pen drive, for example, can create a USB device stack first, over which it can create a storage device stack, where each of the device stacks have two or more device objects.

Once one or more device object(s) 281 are loaded by operating system 170 of server 104, each device object 281 can create a symbolic link (also referred to as a "device interface") to device object 281 and associated device driver 282. The symbolic link is used by applications running on server 104 to access device object 281 and device 240/290. The symbolic link can be created by a call to a function such as IoCreateSymbolicLink( ) including such arguments as a name for the symbolic link, and a name of device object 281 or associated device 240. In one example, for example, a symbolic link to a USB flash drive device 240 is created by a call from a device object 281 for device 240 to the function IoCreateSymbolicLink( ) including arguments "\\GLOBAL??\C:" (i.e., the name for the symbolic link) and "\Device\HarddiskVolume1" (i.e., a name of the device object).

The creation of a symbolic link results in an entry being created in an object manager namespace (OMN) of operating system 170. The OMN stores information on symbolic links created for and used by operating system 170, including symbolic links for devices 240, virtualized devices 290, and applications 270 running on server 104.

As a result of the symbolic link creation process, a symbolic link to device 240 is enumerated in the OMN of server 104. Once the presence of device 240 is reported to operating system 170 of server 104, device 240 may be accessible from a remote session (and associated desktop) running on server 104 (i.e., virtual desktop environment). For example, device 240 may appear as an icon on the virtual desktop environment and/or may be accessed by applications running on server 104.

An application 270 running on server 104 may access device 240 by sending a transaction request including the symbolic link for device 240 to operating system 170. Operating system 170 may consult the Object Manager Namespace to retrieve an address or other identifier for the device itself 240 or for a device object 281 associated with device 240. Using the retrieved address or identifier, operating system 170 forwards the transaction request for device 240 either directly, through a device object 281 of device stack 280, and/or through virtual bus driver 260. Virtual bus driver 260 may direct the transaction request to agent 250, which sends the transaction request to proxy 210 over network 106. Proxy 210 receives the transaction request from agent 250, and directs the received transaction request to stub driver 220. Stub driver 220 then directs the transaction request to device 240 through bus driver 230.

Bus driver 230 receives the result of the transaction request from device 240 and sends the result of the transaction request to stub driver 220. Stub driver 220 directs the result of the transaction request to proxy 210, which sends the result of the transaction request to agent 250 over network 106. Agent 250 directs the result of the transaction request to virtual bus driver 260. Virtual bus driver 260 then directs the result of the transaction request to application 270 either directly or through a device object 281 of device stack 280.

Thus, virtual bus driver 260 may receive transaction requests for device 240 from application 270 and send results of the transaction requests back to application 270 (either directly or through a device object 281 of device stack 280). As such, application 270 may interact with virtual bus driver 260 in the same way as with a bus driver for a device that is connected locally to server 104. Virtual bus driver 260 may hide the fact that it sends transaction requests to agent 250 and receives the results of the transaction requests from agent 250 instead of a device that is connected locally to server 104. As a result, device 240 connected to client 102 may appear to application 270 as if the physical device 240 is connected locally to server 104.

WebUSB is an API that allows a USB device to be accessed from a browser. In the Windows operating system, the Winusb.sys function driver must be loaded in the USB device's stack to enable the browser to communicate with the USB device via the WebUSB API. In typical redirection scenarios, however, the enumeration of the USB device on the server will not cause Winusb.sys to be loaded. To the contrary, the enumeration will typically result in the vendor-provided function driver being loaded—a function driver that does not support the WebUSB API.

BRIEF SUMMARY

The present invention extends to methods, systems, and computer program products for enabling WebUSB access for local and redirected USB devices. To enable WebUSB access to a redirected USB device, the server-side agent can force the Winusb.sys function driver to be loaded on the device stack of the USB device by modifying the device's descriptors that are reported during enumeration. To enable WebUSB access to a local USB device, a hook driver can perform similar modifications during enumeration to thereby force the Winusb.sys function driver to be loaded as the function driver on the device stack. The agent or hook driver can also block WebUSB access to a USB device by removing the WebUSB platform capability descriptor during enumeration and/or by blocking requests to access the USB device that originate from a browser process.

In one embodiment, the present invention is implemented as a method for managing WebUSB support for USB devices. In response to a query for a device descriptor of a USB device, it is determined that the USB device includes a device descriptor that identifies a first version of a USB standard that the USB device supports. The device descriptor is then modified to report a second, subsequent version of the USB standard. In response to a query for a Microsoft OS feature descriptor of the USB device, it is determined that the USB device does not provide a Microsoft OS feature descriptor that defines a compatible ID of WINUSB. It is then reported that the USB device provides a Microsoft OS feature descriptor that defines a compatible ID of WINUSB to thereby force Winusb.sys to be loaded as the function driver for the USB device.

In another embodiment, the present invention is implemented by a server-side agent in a VDI environment as a method for managing WebUSB support for redirected USB devices. The agent receives, from a client-side proxy, a device arrival notification that includes descriptors of a USB device that is connected to the client. The agent notifies a server-side virtual bus driver that the USB device has been connected. The agent then receives, from the virtual bus driver, a query for a Microsoft OS feature descriptor of the USB device, determines that the USB device does not provide a Microsoft OS feature descriptor that defines a compatible ID of WINUSB, and reports back to the virtual bus driver that the USB device provides a Microsoft OS feature descriptor that defines a compatible ID of WINUSB.

In another embodiment, the present invention is implemented as computer storage media storing computer executable instructions which when executed implement a method for managing WebUSB support for USB devices. The method includes: enumerating a USB device; during enumeration, determining that the USB device includes a device descriptor that identifies a first version of a USB standard that the USB device supports; modifying the device descriptor to report a second version of the USB standard, the second version being subsequent to the first version; during enumeration, determining that the USB device does not provide a Microsoft OS feature descriptor that defines a compatible ID of WINUSB; and reporting that the USB device provides a Microsoft OS feature descriptor that defines a compatible ID of WINUSB.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

As introduced above, the WebUSB API allows webpages or other browser-based applications to access a USB device directly from the browser. In Windows environments, the WebUSB API works in conjunction with the Winusb.sys function driver. Many USB devices, however, are not designed to use Winusb.sys as their function driver. The present invention is directed to techniques for forcing Winusb.sys to be loaded as the function driver for a USB device even though the USB device is not designed to use Winusb.sys as its function driver. For purposes of this specification and the claims, the term Winusb.sys should be construed as encompassing the Winusb.sys function driver as it is currently defined as well as any equivalent function driver that may replace the Winusb.sys function driver in the future.

FIGS. 3A-3H illustrate a sequence of steps that can be performed when a USB device is redirected to enable WebUSB access by forcing the Winusb.sys function driver to be loaded on the server-side device stack of the redirected USB device. Given that the overall redirection of USB devices will be accomplished in the same manner as described in the background, these figures will reference many of the same components shown in FIG. 2. Notably, the present invention can employ a server-side agent 350 that modifies the redirection process described in the background to thereby enable WebUSB access to the redirected USB device in a manner that is transparent to the client-side components.

For purposes of this example, it will be assumed that USB device 240 is not WebUSB enabled. For example, device 240 may be a printer that adheres to the USB 2.0 or 1.1 standard (as opposed to the USB 2.1 or later standard). In such cases, when device 240 is enumerated, the PnP manager of the operating system will use a hardware ID consisting of the device's vendor and product IDs to locate and load the function driver. Importantly, this function driver would not be Winusb.sys (or any other function driver that can enable WebUSB access). It is noted, however, that USB device 240 could be a USB 2.1 device but may be configured to cause a function driver other than Winusb.sys to be loaded. In short, the present invention is applicable to any USB device that is configured to use a function driver other than Winusb.sys. In contrast, if the USB device is configured to use Winusb.sys as its function driver, redirection can be accomplished in a typical fashion.

Figure 3A:
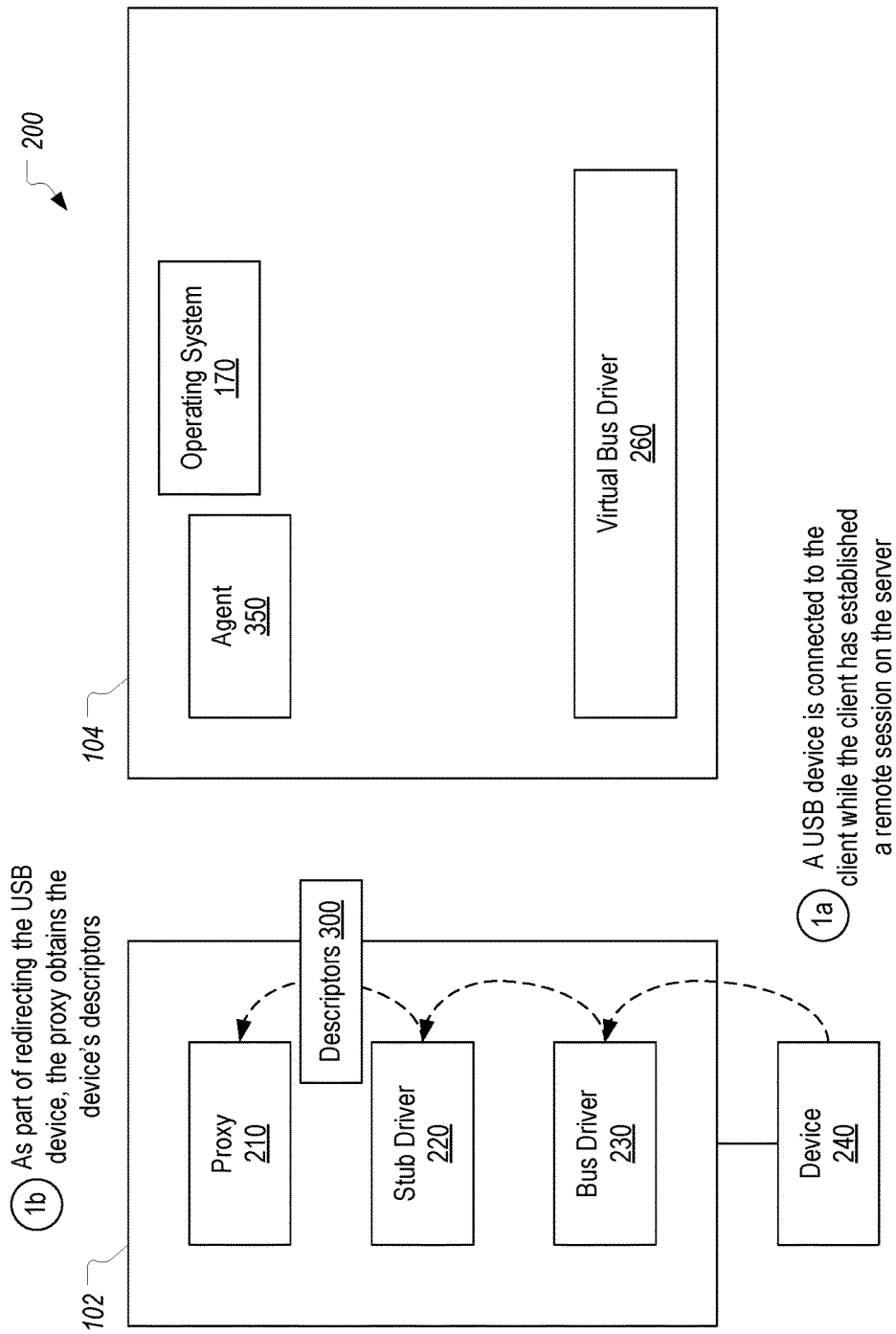
FIGS. 3A-3H illustrate how WebUSB access can be enabled for a redirected device.

Turning to FIG. 3A, it is assumed that a user has employed client 102 to establish a remote session on server 104. As part of establishing this remote session, in step 1a, proxy 210 can determine that device 240 is connected to client 102 and that device 240 should be redirected to server 104 to enable the user to access device 240 from the remote session. Therefore, in step 1b, proxy 210 can request device 240's descriptors 300. As is known, descriptors 300 would include a device descriptor, one or more configuration descriptors, one or more interface descriptors, one or more endpoint descriptors, and typically a number of string descriptors (e.g., serial number string descriptor, a language ID string descriptor, a product ID string descriptor, etc.).

Figure 3B:
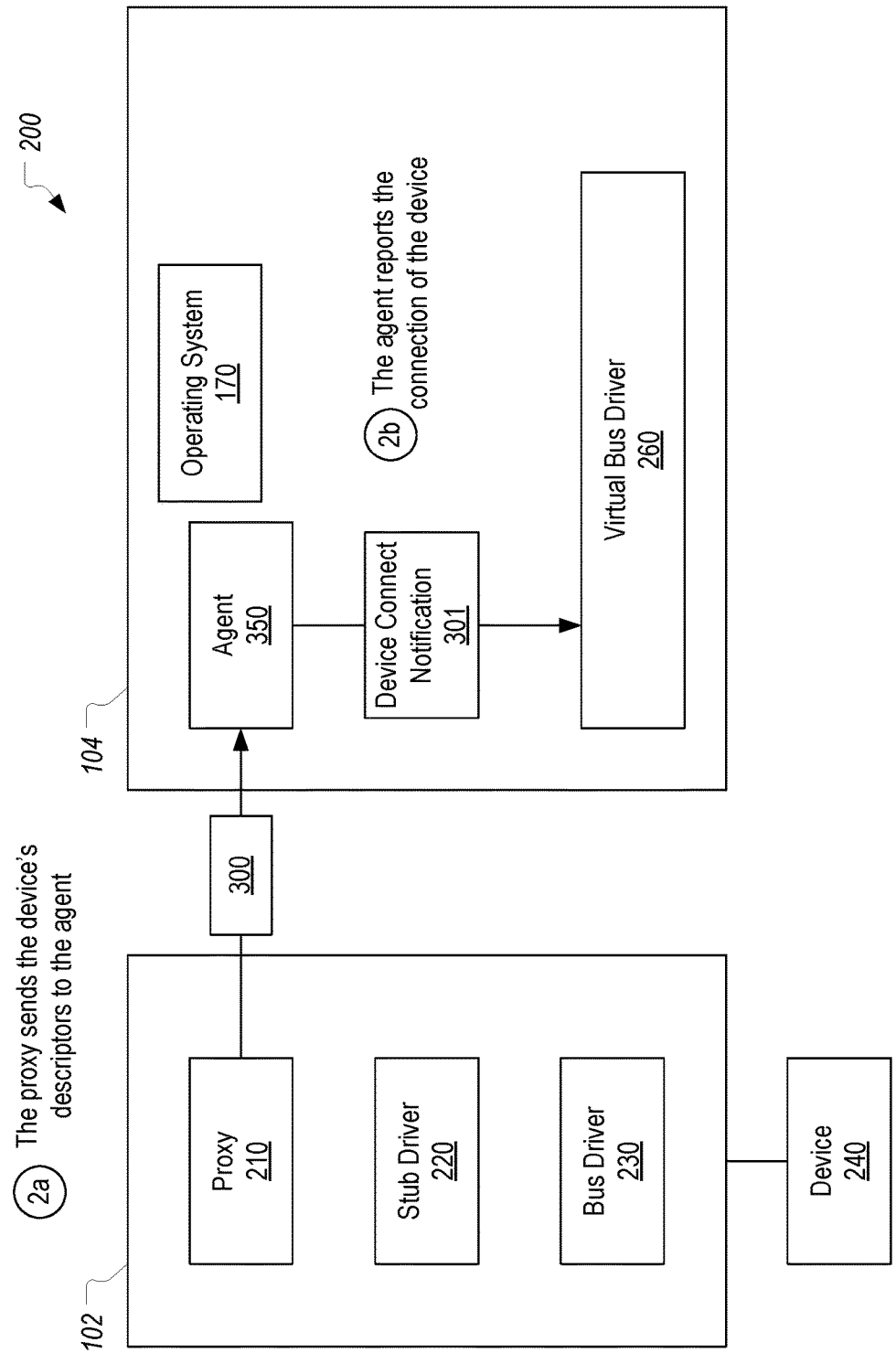

In accordance with redirection techniques, proxy 210 will send descriptors 300 to agent 350 as represented by step 2a in FIG. 3B. Then, in step 2b, agent 350 will send a device connect notification 301 to virtual bus driver 260. Device connect notification 301 can represent any communication that agent 350 may send to inform virtual bus driver 260 that a device is available for redirection.

Figure 3C:
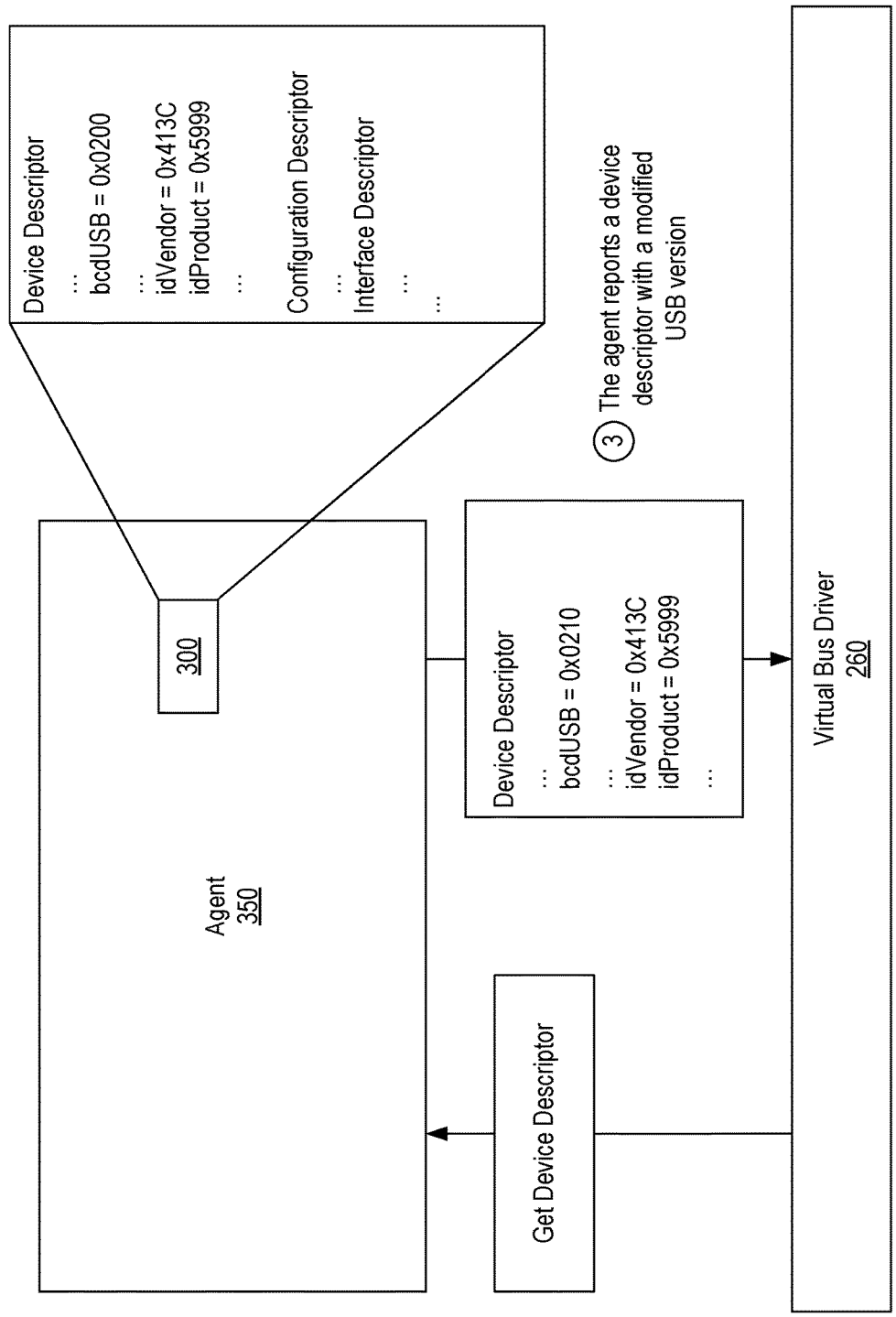

In response to device connect notification 301, virtual bus driver 260 will commence the enumeration process to obtain the descriptors necessary to cause a device stack to be loaded on server 104 for the redirected device. As represented in FIG. 3C, this enumeration includes requesting the device descriptor. As mentioned above, it is assumed that USB device 240 adheres to the USB 2.0 standard and therefore, the device descriptor within descriptors 300 will include a bcdUSB member that is set to 0x0200. As is known, the bcdUSB member of a USB device descriptor specifies the version of the USB specification that the descriptor structure complies with, and the hexadecimal value 0200 represents version 2.0. It is also assumed that the device descriptor within descriptors 300 defines an idVendor member of 0x413C (which represents Dell Computer Corp.) and an idProduct member of 0x5999 (which is assumed to represent a printer). In step 3, however, contrary to what is defined in descriptors 300, agent 350 reports a device descriptor having the bcdUSB member set to 0x0210. In other words, agent 350 reports device 240 as a USB 2.1 device rather than a USB 2.0 device. The reason for modifying the USB version in this manner will be described below. Although not shown, virtual bus driver 260 will also request the configuration descriptor(s).

Figure 3D:
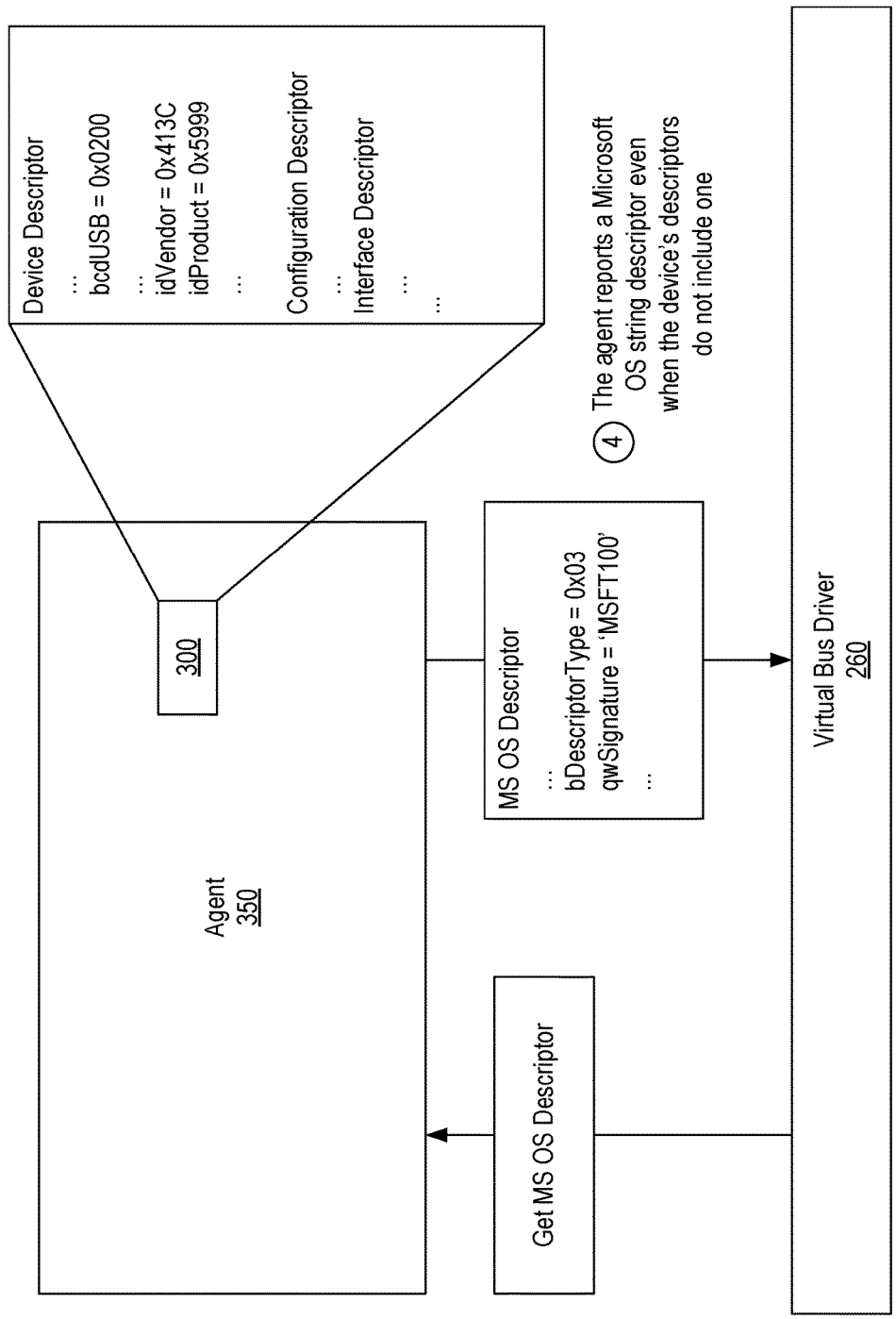
Figure 3E:
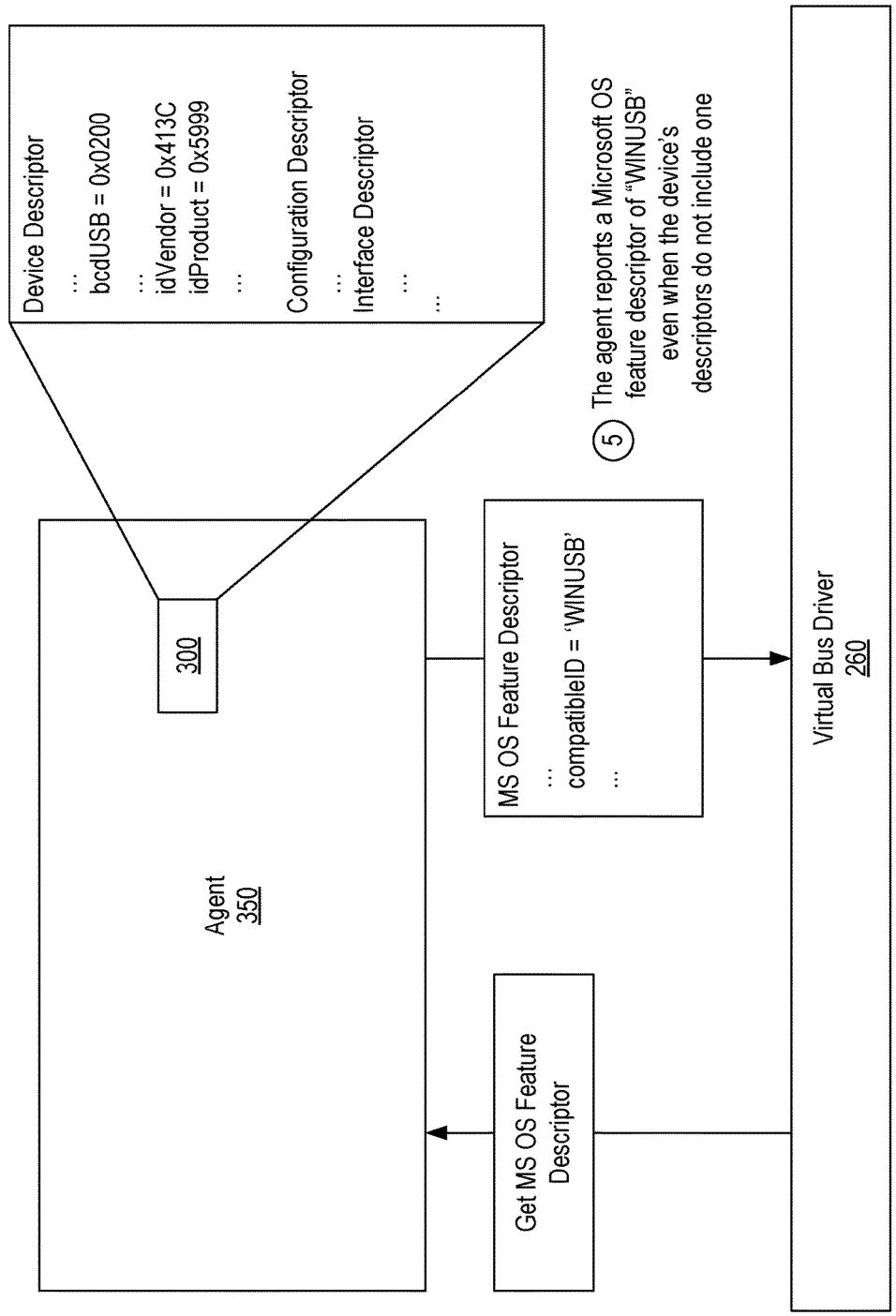

Turning to FIG. 3D, the enumeration process continues with virtual bus driver 260 querying agent 350 for a Microsoft (MS) OS descriptor. The MS OS descriptor is a standard USB string descriptor that is used to indicate that a USB device provides one or more MS OS feature descriptors. The MS OS descriptor also provides information necessary to retrieve the MS OS feature descriptors. Although not applicable to this example, this query for the MS OS descriptor will only be performed when the bcdUSB member of the device descriptor is 0x0200 or greater (i.e., if the device adheres to USB version 1.0 or 1.1, the MS OS descriptor will not be requested during enumeration). Therefore, in the case where the redirected USB device may adhere to version 1.0 or 1.1 of the USB standard, the changing of the bcdUSB member to 0x0210 would ensure that virtual bus driver 260 queries agent 350 for the MS OS descriptor.

In the current example, it will be assumed that descriptors 300 do not include an MS OS descriptor. In spite of this, in step 4, agent 350 responds to the MS OS descriptor query by sending an MS OS descriptor (e.g., a string descriptor with the bDescriptorType member set to 0x03 and a qwSignature member set to "MSFT100"). By reporting an MS OS descriptor, agent 350 informs virtual bus driver 260 that device 240's descriptors include one or more MS OS feature descriptors.

Because agent 350 reports an MS OS descriptor, virtual bus driver 260 will subsequently request the MS OS feature descriptor(s). Again, it is assumed that descriptors 300 do not include any MS OS feature descriptors. In spite of this, and as represented in step 5 of FIG. 3E, agent 350 responds to the request by sending an MS OS feature descriptor that includes a compatibleID member set to "WINUSB."

Figure 3F:
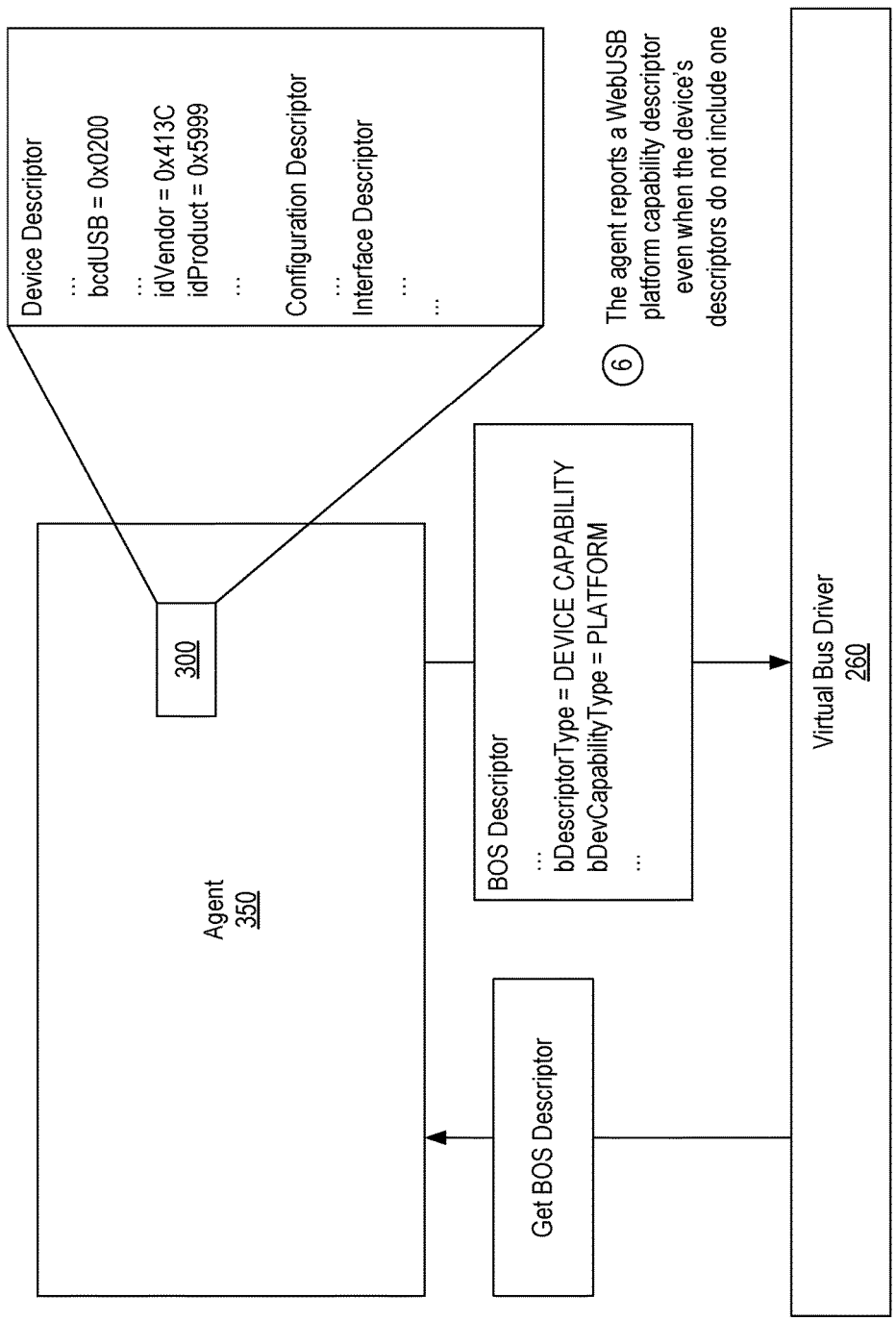
Figure 3G:
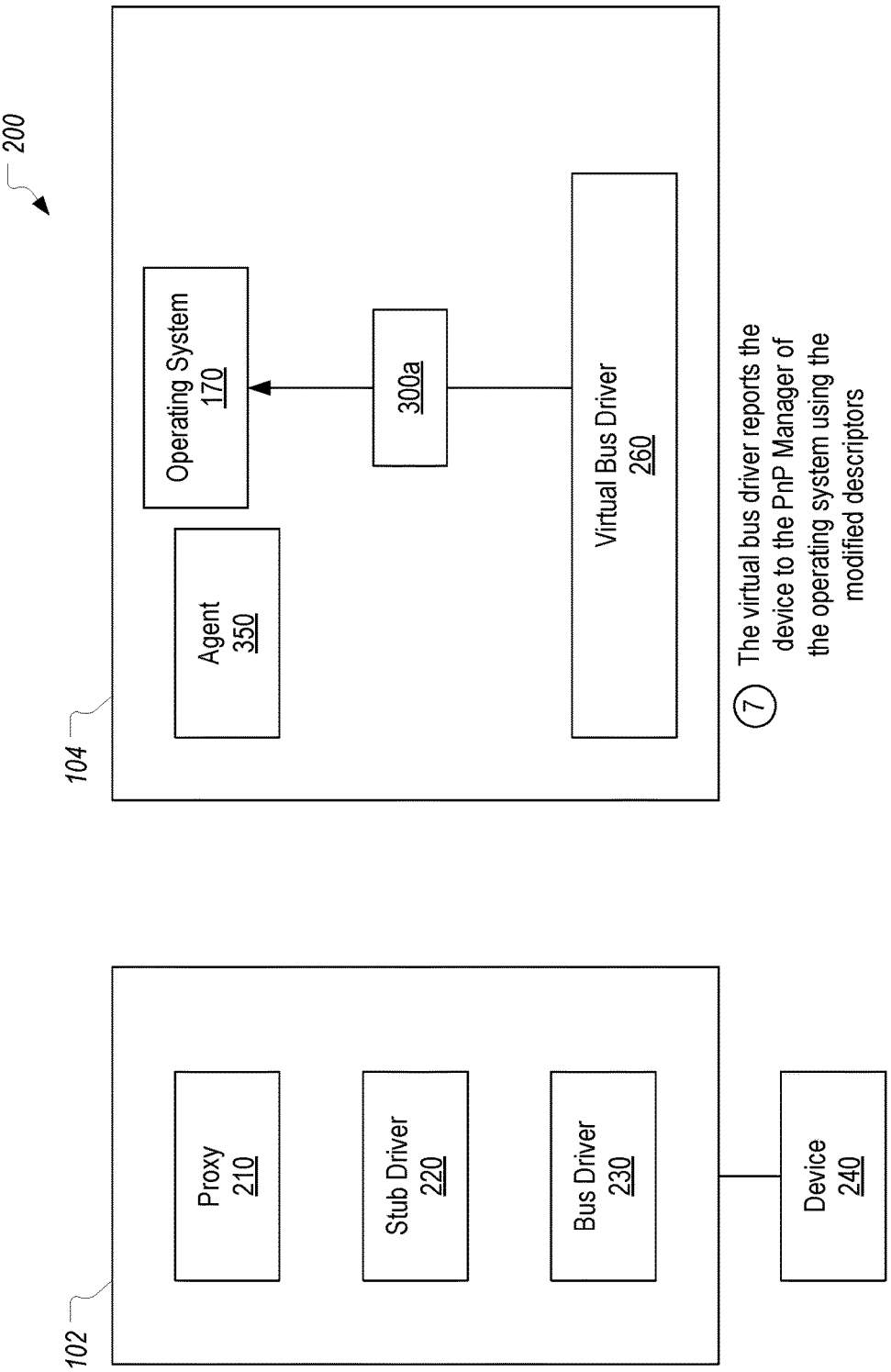
Figure 3H:
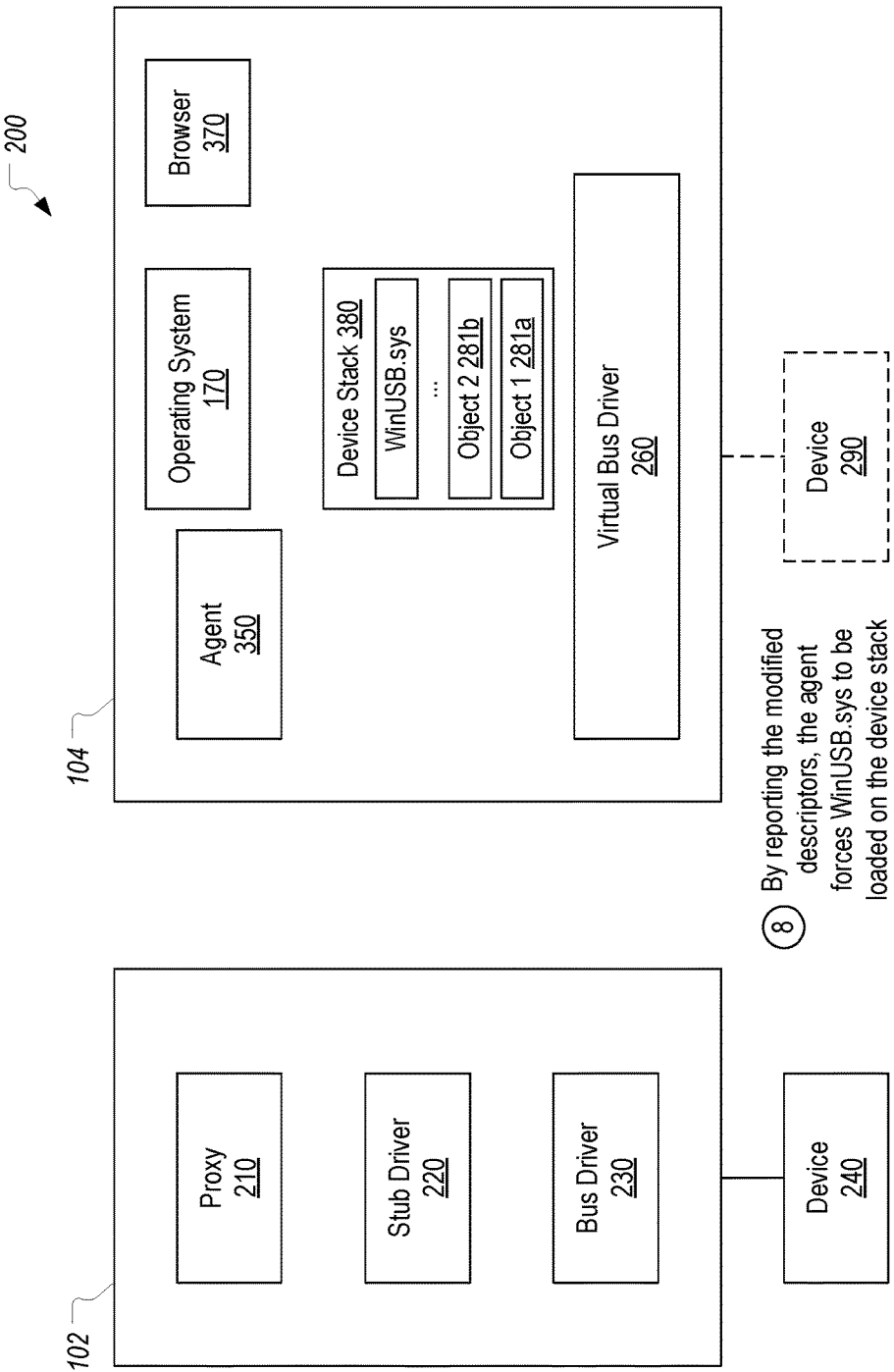

Turning to FIG. 3F, because agent 350 reported that device 240 adheres to version 2.1 of the USB standard, virtual bus driver 260 will query agent 350 for the binary object store (BOS) descriptor as part of the enumeration process. In contrast, if agent 350 had reported device 240 as a USB 2.0 or earlier device, virtual bus driver 260 would not have queried for the BOS descriptor. Accordingly, by reporting a device descriptor with the bcdUSB member set to 0x0210, agent 350 can ensure that virtual bus driver 260 will query for both the MS OS descriptor as well as the BOS descriptor.

Because device 240 adheres to version 2.0 of the USB standard, it will not include a BOS descriptor. In spite of this, agent 350 will respond to the query by sending a BOS descriptor that defines that device 240 supports WebUSB as represented in step 6 in FIG. 3F. In particular, agent 350 can report the platform capability descriptor defined in the WebUSB specification.

After this enumeration process, and contrary to the actual values in descriptors 300, agent 350 will have enumerated a USB device that adheres to USB version 2.1 and that provides an MS OS feature descriptor with a compatibleID of WinUSB and a WebUSB platform capability descriptor. As a result, virtual bus driver 260 will report USB device 240 to the PnP manager of operating system 170 using the modified descriptors 300a as represented in step 7 in FIG. 3G. In particular, virtual bus driver 260 can call IoInvalidateDeviceRelations to cause the PnP manager to send an IRP_MN_QUERY_DEVICE_RELATIONS request. In response, virtual bus driver 260 will create a physical device object for device 240. Importantly, this physical device object will reflect the modified descriptors 300a rather than the actual descriptors 300 of device 240 (e.g., by reporting a compatible ID of USB\MS_COMP_WINUSB). As a result, and as represented in step 8 of FIG. 3H, device stack 380 will include Winusb.sys as the function driver for device 240 (or virtual device 290) rather than the function driver that otherwise would have been loaded (e.g., the function driver associated with a hardware ID of USB\VID_413C&PID_5999 . . . ).

By forcing Winusb.sys to be loaded as the function driver for device 240, device 240 will be accessible within browser 370 via the WebUSB API. Accordingly, any webpage or browser-based application executing within browser 370 will be able to access device 240. In this way, even though a redirected device may not be configured to support WebUSB access, agent 350 can redirect the device in a manner that causes it to be accessible via the WebUSB API. Accordingly, the present invention causes virtually any USB device that is compatible with the Winusb.sys function driver to also be accessible via the WebUSB API.

Figure 4A:
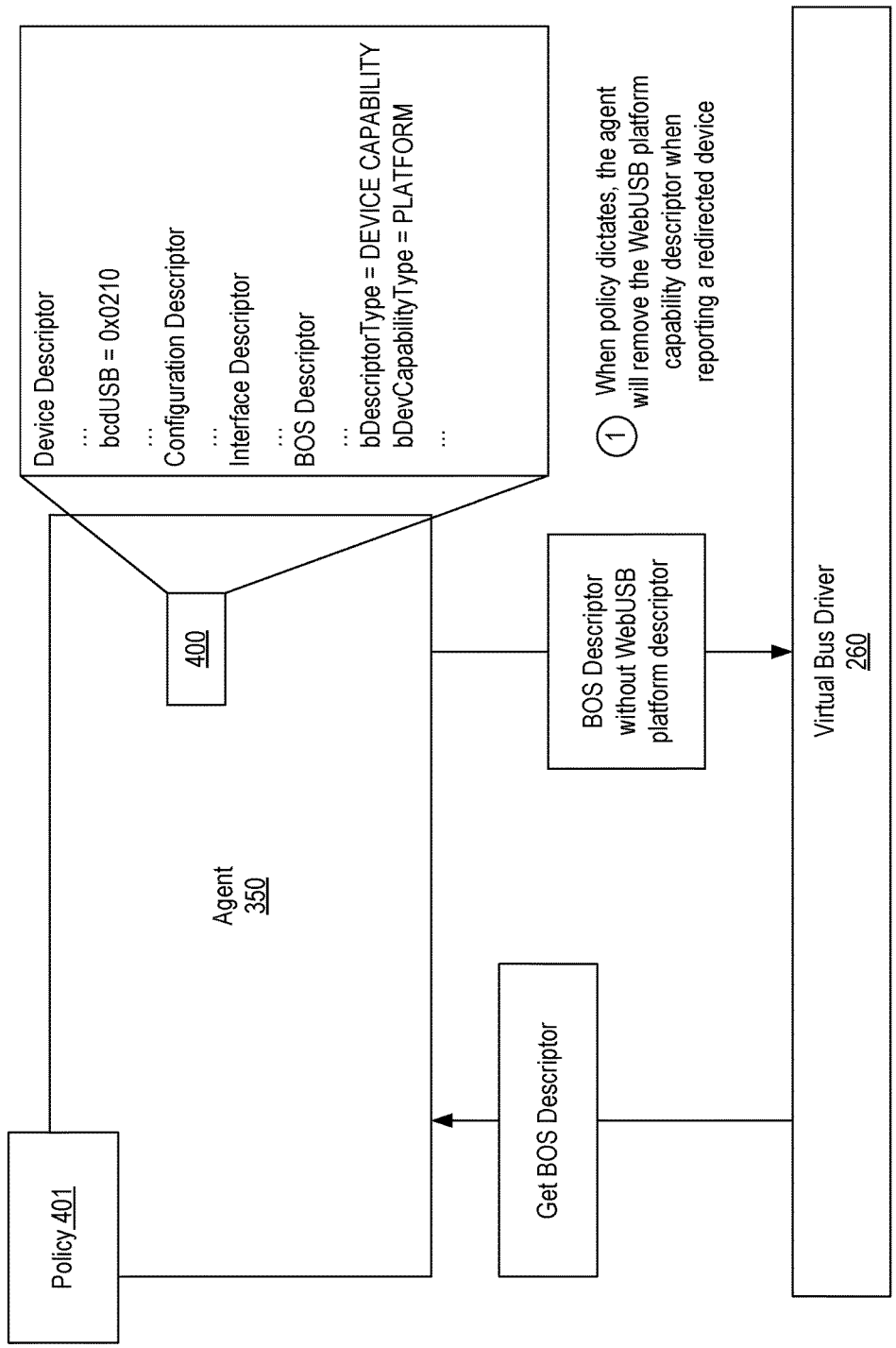
FIGS. 4A and 4B illustrate how WebUSB access can be selectively blocked based on policy.
Figure 4B:
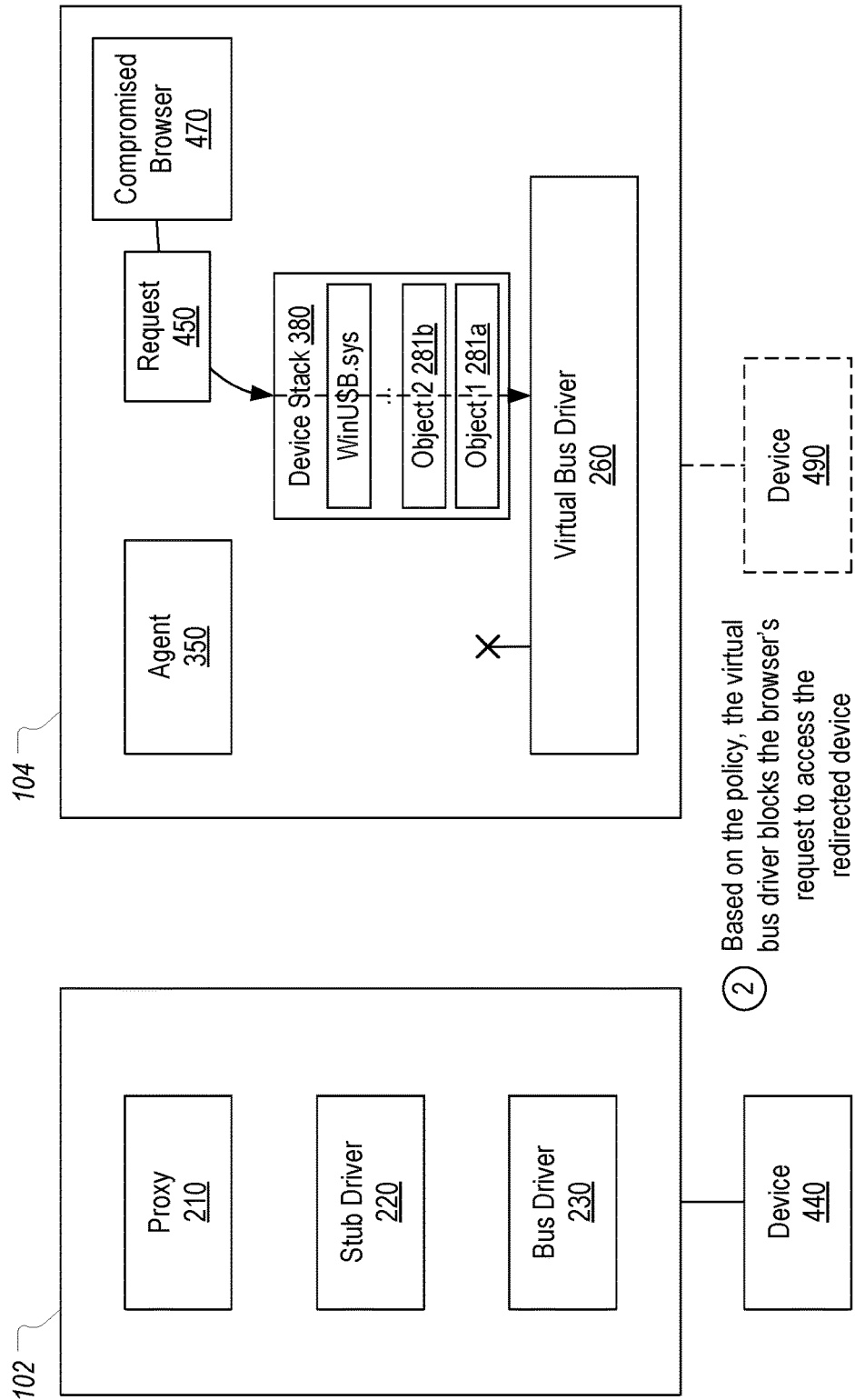

In some cases, it may not be desirable to allow a USB device to be accessed from the browser even when the USB device supports WebUSB. Therefore, in some embodiments, the present invention can implement a technique for disabling WebUSB support. FIGS. 4A and 4B illustrate how this can be accomplished.

FIG. 4A is similar to FIG. 3F and therefore represents the step in the enumeration process where virtual bus driver 260 queries agent 350 for the BOS descriptor. However, in this example, it will be assumed that a policy 401 (e.g., an Active Directory group policy) governs the redirection of USB devices and includes a provision that USB devices (or at least a particular type of USB device) should not be accessible via the WebUSB API. Also, it will be assumed that the USB device that is being enumerated (device 440) has descriptors 400 that include a BOS descriptor defining the WebUSB platform capability descriptor.

As represented in step 1 in FIG. 4A, because policy 401 dictates that USB devices should not be accessible via the WebUSB API, agent 350 can respond to the request for the BOS descriptor by omitting the WebUSB platform capability descriptor. This may entail modifying the BOS descriptor to remove the WebUSB platform capability descriptor and updating the header of the BOS descriptor to reflect the removal (e.g., by decrementing the number of device capabilities and adjusting the total length). As a result, virtual bus driver 260 will report device 440 as not supporting the WebUSB command set.

Under normal conditions, the removal of the WebUSB platform capability descriptor will prevent USB device 440 from being accessed within the browser. However, assuming Winusb.sys is loaded as the function driver for USB device 440 (or virtual device 490), a compromised browser 470 could still gain access to USB device 440. Such a scenario is represented in FIG. 4B. As shown, browser 470 could be compromised to ignore the fact that device 440 was reported as not supported the WebUSB command set and still generate a request 450 targeting device 440. Request 450 would be passed down device stack 380 to virtual bus driver 260.

To ensure that policy 401 is enforced, virtual bus driver 260 can be configured to evaluate any request to access device 440 and block any request that originated from a browser. For example, virtual bus driver 260 can obtain the process ID associated with request 450 (e.g., by calling PsGetCurrentProcessId) and use the process ID to obtain the name of the requesting application (e.g., by calling ZwQueryInformationProcess). If this evaluation reveals that the requesting application is the browser, virtual bus driver 260 can fail the request, as shown in FIG. 4B as step 2, rather than routing the request to agent 350 for delivery to client 102. In contrast, if an application other than a browser sends a request to access device 440, virtual bus driver 260 can allow the request to proceed.

Figure 5A:
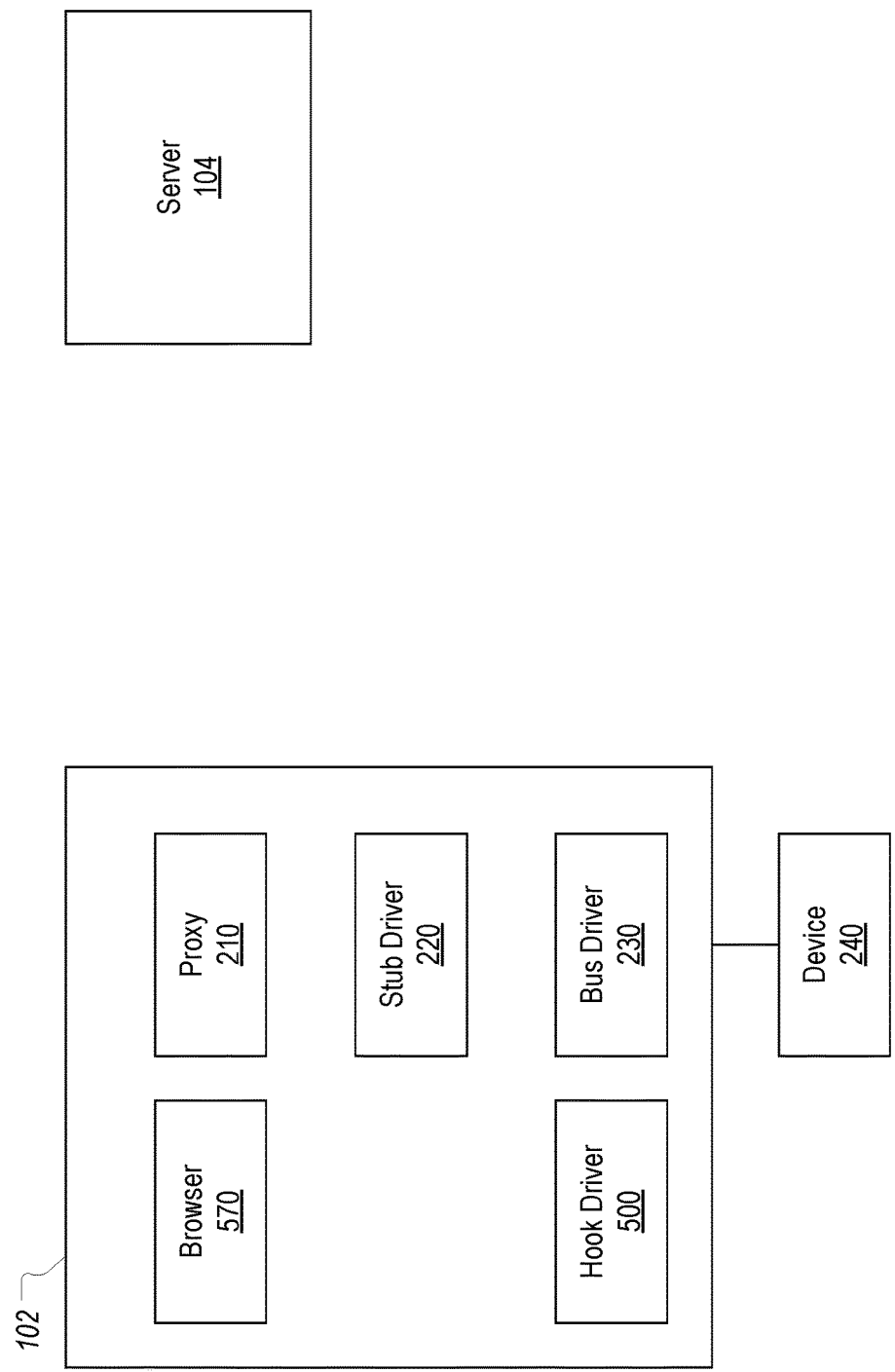
FIGS. 5A and 5B illustrate how client-side WebUSB access can be enabled when a device is not redirected.
Figure 5B:
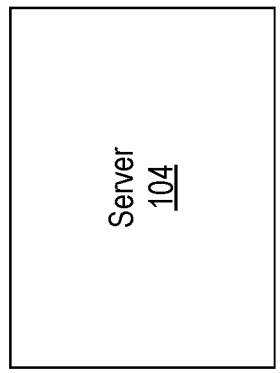
Figure 5B:
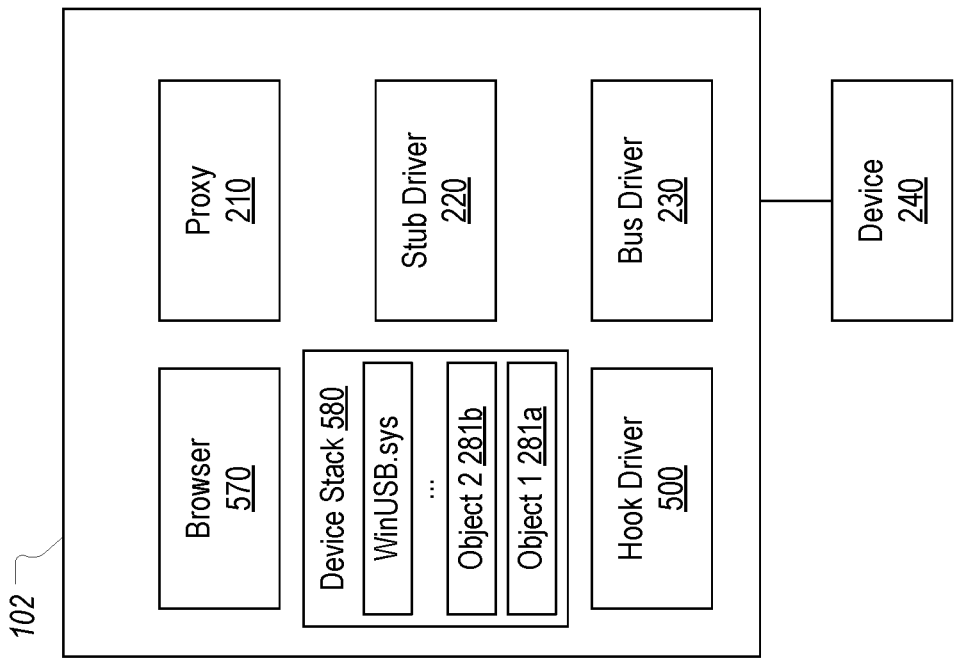

These techniques for enabling WebUSB access have been described in the context of a redirected device. Such techniques can similarly be applied on the client side to enable WebUSB access from a local browser. FIGS. 5A and 5B represent how this can be accomplished.

In FIG. 5A, client 102 and server 104 are assumed to include the same VDI components as described above. FIG. 5A is therefore intended to represent that the technique for enabling WebUSB access at the client side can be implemented in conjunction with establishing remote sessions. In other words, a user could establish a remote session on server 104 while also using a local browser to access a local USB device 240. It is noted, however, that this technique can equally be implemented when client 102 does not establish remote sessions.

Figure 1:
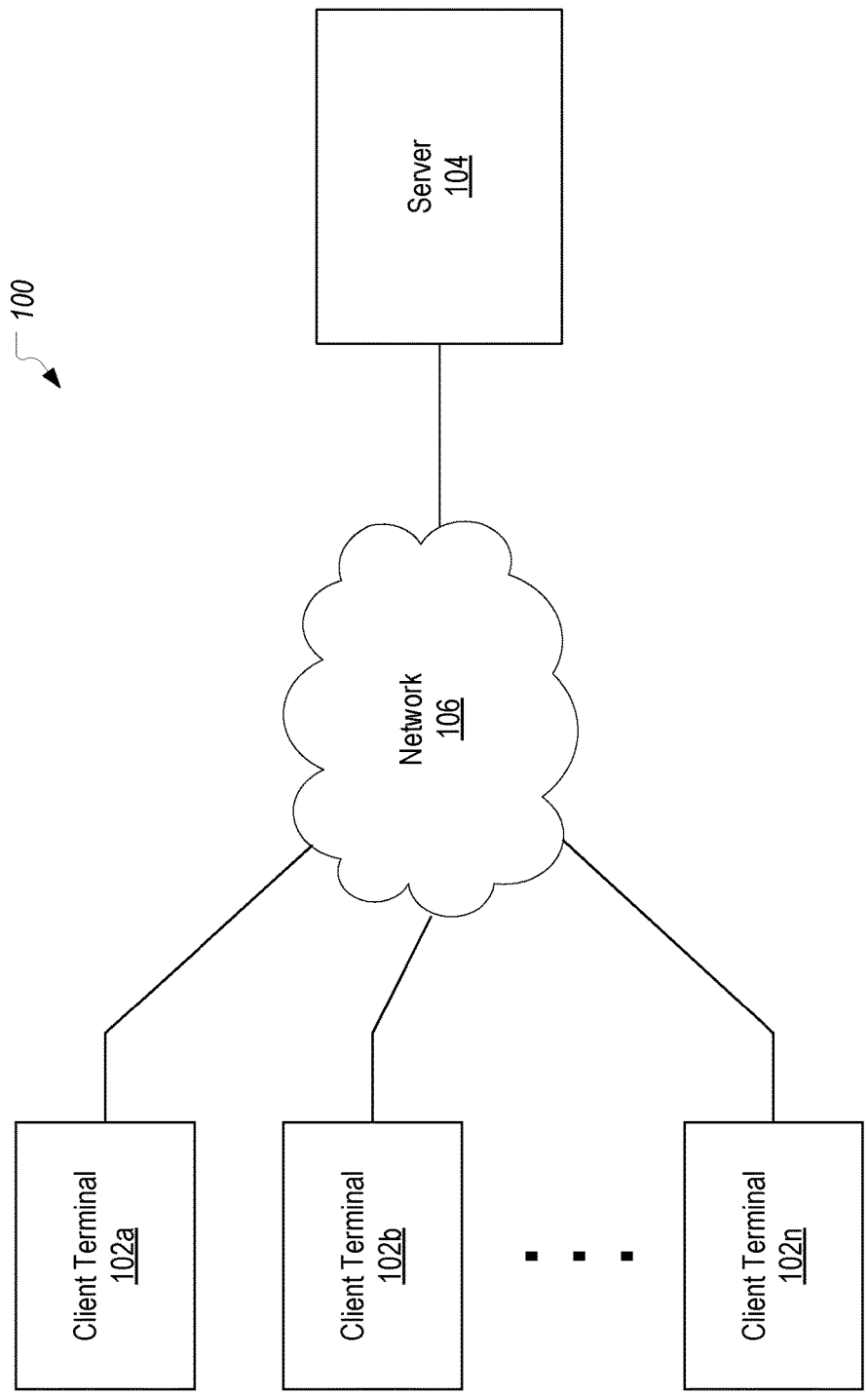
FIG. 1 illustrates an example computing environment in which the present invention can be implemented.
Figure 2:
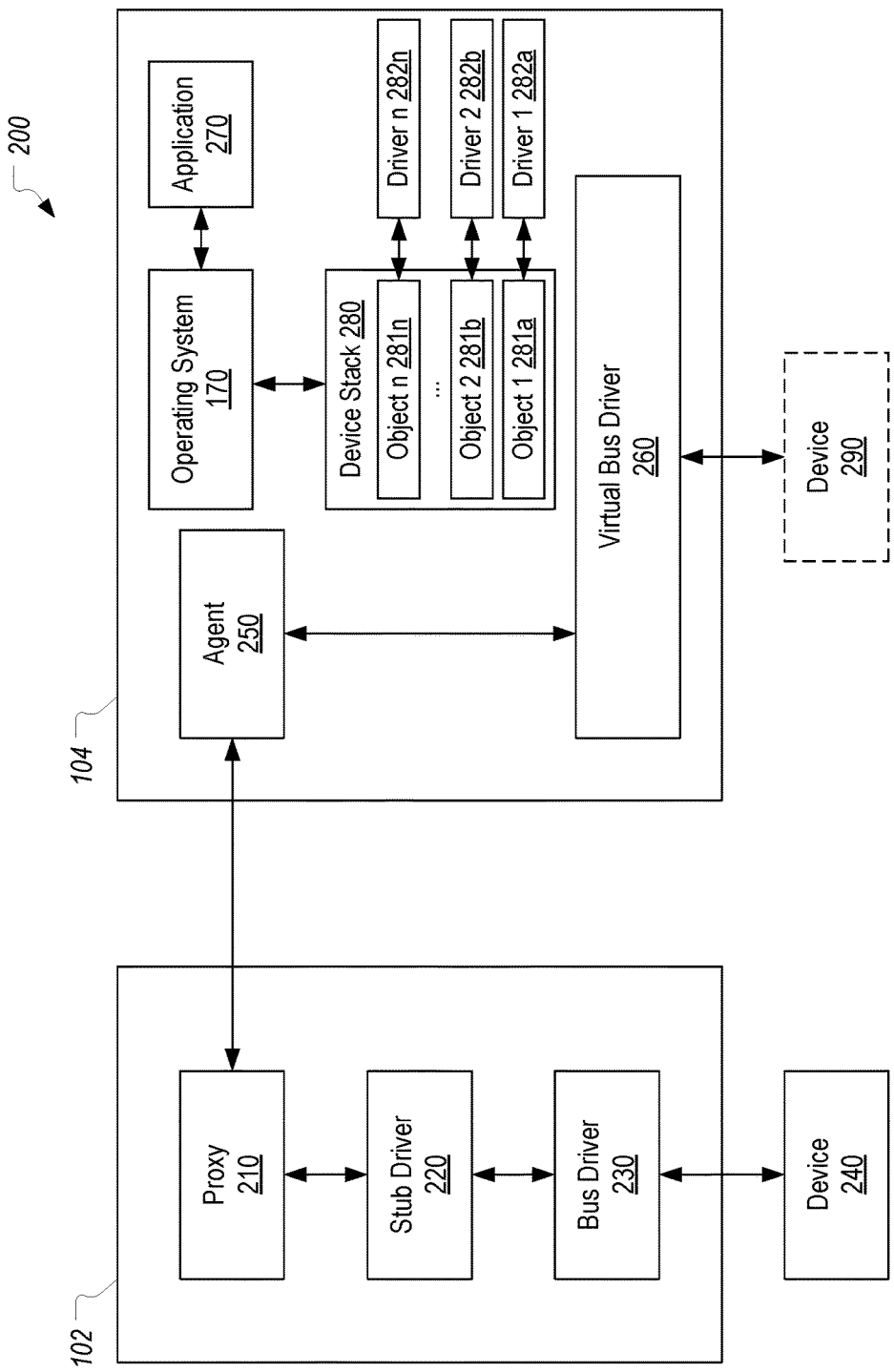
FIG. 2 illustrates how a USB device can be redirected from a client terminal to a server.

In contrast to what is shown in FIG. 2, client 102 also includes a hook driver 500 and a browser 570. Hook driver 500, which can use any suitable hooking technique, can modify the enumeration process that bus driver 230 performs in much the same manner that agent 350 is described as modifying the server-side enumeration process. In particular, and assuming device 240 has descriptors 300, hook driver 500 can modify the enumeration process so that device 240 reports a device descriptor with the bcdUSB member set to 0x0210 (or greater), an MS OS descriptor having an MS OS feature descriptor with a compatible ID of WINUSB, and a BOS descriptor that includes the WebUSB platform capability descriptor.

As is represented in FIG. 5B, and as a result of the modifications that hook driver 500 makes to the enumeration process, the operating system on client 102 will cause a device stack 580 to be loaded for device 240 and this device stack will include Winusb.sys as the function driver. The client-side browser 570 will therefore be able to access USB device 240 via the WebUSB API. Although not shown, hook driver 500, like virtual bus driver 260, can also be configured to selectively remove the WebUSB platform capability descriptor during enumeration if a governing policy dictates that the USB device should not be accessible within the browser and can also selectively block any requests to access a USB device that originate from the browser.

Figure 6:
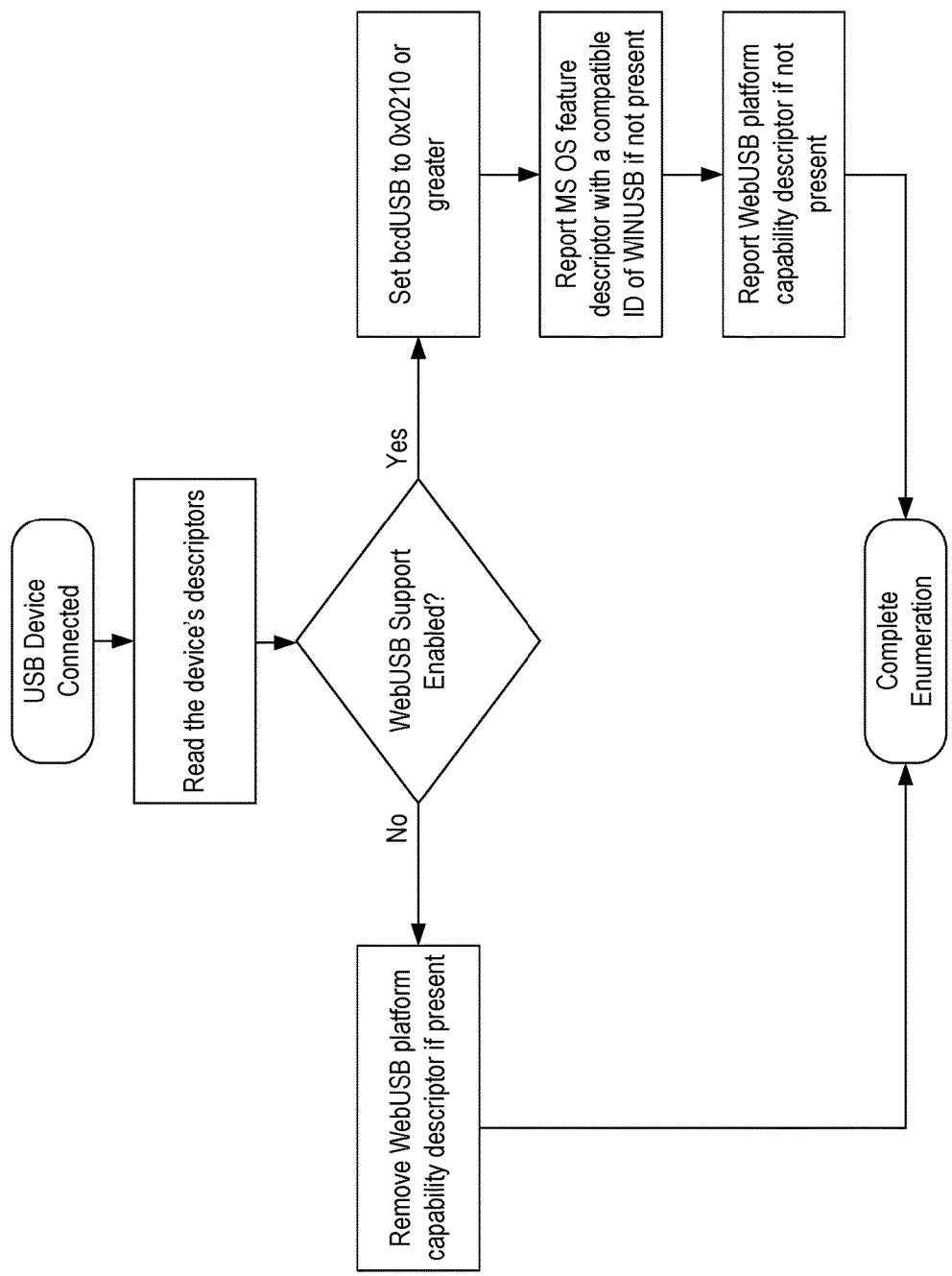
FIG. 6 illustrates a flow diagram representing how WebUSB support can be managed for a local or redirected USB device.

FIG. 6 provides a flow diagram generally representing the modifications that agent 350 or hook driver 500 can cause to the enumeration process to manage WebUSB support for a redirected or local USB device respectively. When a USB device is connected, whether locally or via redirection, agent 350 or hook driver 500 can read the device's descriptors. In the case of hook driver 500, this reading of the device's descriptors may be performed iteratively as bus driver 230 enumerates the device (e.g., by intercepting and modifying device 240's responses to enumeration queries). In the case of agent 350, proxy 210 may read the device's descriptors that are included in a device arrival notification sent by proxy 210.

Agent 350 or hook driver 500 can evaluate any policy governing the USB device to determine whether WebUSB support should be enabled. If WebUSB support should not be enabled, agent 350 or hook driver 500 can remove the WebUSB platform capability descriptor, if present, from any BOS descriptor. In contrast, if WebUSB support should be enabled, agent 350 or hook driver 500 can set the bcdUSB member of the device descriptor to 0x0210 or greater if necessary, report an MS OS descriptor and an MS OS feature descriptor with a compatible ID of WINUSB if not already present, and report the WebUSB platform capability descriptor if not already present. Enumeration can then be completed thereby causing Winusb.sys to be loaded as the function driver for the USB device. Although not shown, in instances where WebUSB support should not be enabled, agent 350 or hook driver 500 can also monitor each request targeting the USB device to determine the source of the request and to block any request that originated from a browser process.

Figure 7:
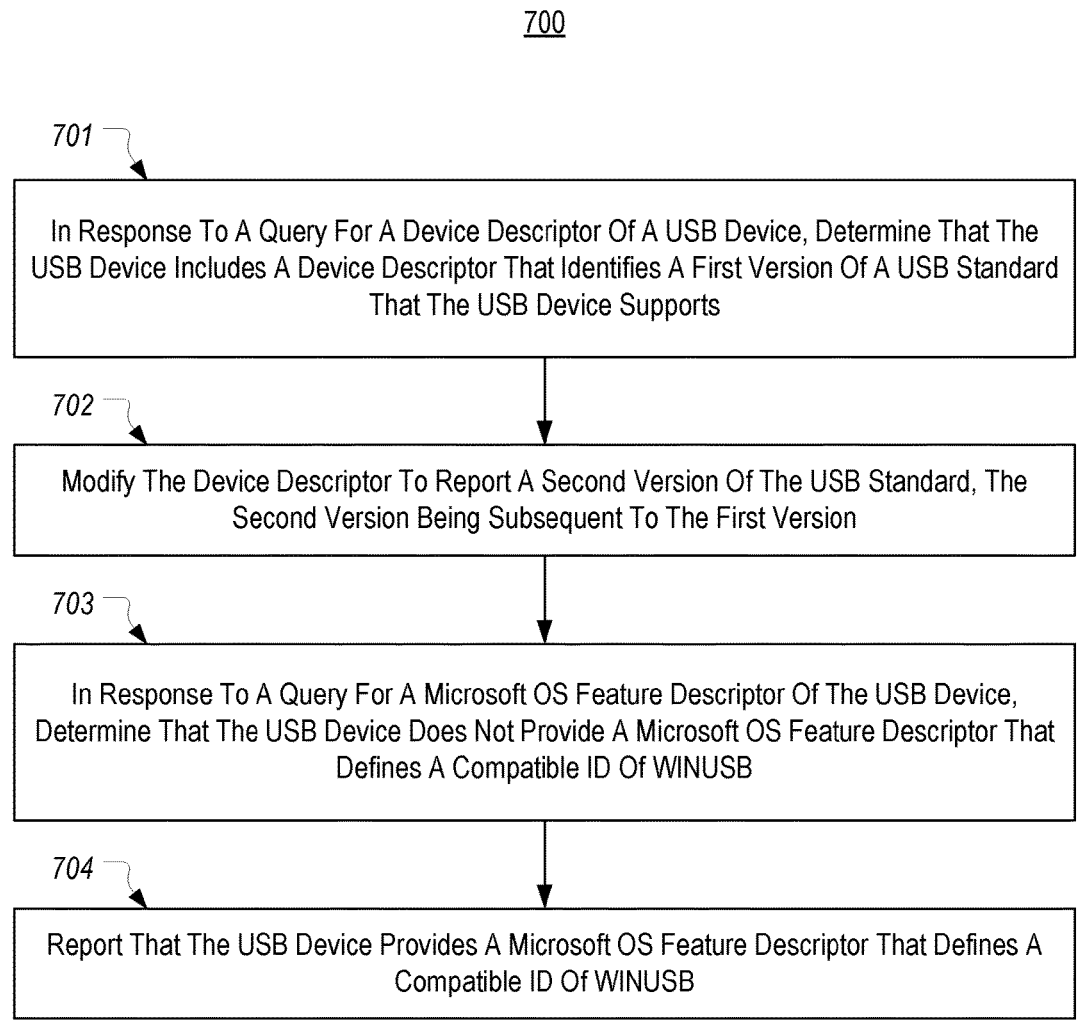
FIG. 7 illustrates a flowchart of an example method for managing WebUSB support for USB devices.

FIG. 7 provides a flowchart of an example method 700 for managing WebUSB support for USB devices. Method 700 can be performed by agent 350 or by hook driver 500 in conjunction with the other components of a USB subsystem.

Method 700 includes an act 701 of, in response to a query for a device descriptor of a USB device, determining that the USB device includes a device descriptor that identifies a first version of a USB standard that the USB device supports. For example, when USB device 240 is redirected to server 104 and enumerated, agent 350 can evaluate the device descriptor of USB device 240 to determine that the bcdUSB member is set to 0x0200 or lower.

Method 700 includes an act 702 of modifying the device descriptor to report a second version of the USB standard, the second version being subsequent to the first version. For example, agent 350 can set the bcdUSB member to 0x0210 or greater.

Method 700 includes an act 703 of, in response to a query for a Microsoft OS feature descriptor of the USB device, determining that the USB device does not provide a Microsoft OS feature descriptor that defines a compatible ID of WINUSB. For example, agent 350 can determine that descriptors 300 do not include any Microsoft OS feature descriptors.

Method 700 includes an act 704 of reporting that the USB device provides a Microsoft OS feature descriptor that defines a compatible ID of WINUSB. For example, agent 350 can create and report a Microsoft OS feature descriptor that defines a compatible ID of WINUSB.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for managing WebUSB support for USB devices, the method comprising:
   in response to a query for a device descriptor of a USB device, determining that the USB device includes a device descriptor that identifies a first version of a USB standard that the USB device supports;
   modifying the device descriptor to report a second version of the USB standard, the second version being subsequent to the first version;
   in response to a query for a Microsoft OS feature descriptor of the USB device, determining that the USB device does not provide a Microsoft OS feature descriptor that defines a compatible ID of WINUSB; and
   reporting that the USB device provides a Microsoft OS feature descriptor that defines a compatible ID of WINUSB.

2. The method of claim 1, further comprising:
   in response to a query for a binary object store descriptor of the USB device, determining that the USB device does not provide a WebUSB platform capability descriptor; and
   reporting that the USB device provides a binary object store descriptor that includes a WebUSB platform capability descriptor.

3. The method of claim 1, wherein the second version of the USB standard is version 2.1 or greater.

4. The method of claim 1, wherein the USB device is connected to a client and the queries are received by a server-side agent from a server-side virtual bus driver.

5. The method of claim 1, wherein the USB device is connected to a client and the queries are received by a client-side hook driver that modifies enumeration functionality of a client-side bus driver.

6. The method of claim 1, further comprising:
   prior to the query for the Microsoft OS feature descriptor, reporting that the USB device provides a Microsoft OS descriptor.

7. The method of claim 1, wherein a server-side agent reports that the USB device provides a Microsoft OS feature descriptor that defines the compatible ID of WINUSB, the method further comprising:
   reporting, by a server-side virtual bus driver and to the server-side operating system, a compatible ID of USB\MS_COMP_WINUSB for the USB device.

8. The method of claim 1, further comprising:
detecting enumeration of a second USB device;
determining that a policy dictates that the second USB device should not be accessible via WebUSB;
determining that the second USB device provides a binary object store descriptor that includes a WebUSB platform capability descriptor; and
removing the WebUSB platform capability descriptor from the binary object store descriptor of the second USB device.

9. The method of claim 8, further comprising:
monitoring requests to access the second USB device;
determining that a request to access the second USB device originated from a browser process; and
blocking the request.

10. The method of claim 9, further comprising:
determining that a second request to access the second USB device originated from a non-browser process; and
allowing the request.

11. A method, performed by a server-side agent in a VDI environment, for managing WebUSB support for redirected USB devices, the method comprising:
receiving, from a client-side proxy, a device arrival notification that includes descriptors of a USB device that is connected to the client;
notifying a server-side virtual bus driver that the USB device has been connected;
receiving, from the virtual bus driver, a query for a Microsoft OS feature descriptor of the USB device;
determining that the USB device does not provide a Microsoft OS feature descriptor that defines a compatible ID of WINUSB; and
reporting, to the virtual bus driver, that the USB device provides a Microsoft OS feature descriptor that defines a compatible ID of WINUSB.

12. The method of claim 11, further comprising:
receiving, from the virtual bus driver, a query for a binary object store descriptor of the USB device
determining that the USB device does not provide a WebUSB platform capability descriptor; and
reporting, to the virtual bus driver, that the USB device provides a binary object store descriptor that includes a WebUSB platform capability descriptor.

13. The method of claim 11, further comprising:
receiving, from the virtual bus driver, a query for a device descriptor of the USB device;
determining that the USB device includes a device descriptor that identifies a first version of a USB standard that the USB device supports; and
modifying the device descriptor to report a second version of the USB standard, the second version being subsequent to the first version.

14. The method of claim 11, wherein the second version of the USB standard is 2.1 or greater.

15. The method of claim 11, further comprising:
receiving a second device arrival notification that includes descriptors of a second USB device;
accessing a policy that dictates that the second USB device should not be accessible via WebUSB;
determining that the second USB device provides a binary object store descriptor that includes a WebUSB platform capability descriptor;
removing the WebUSB platform capability descriptor from the binary object store descriptor of the second USB device; and
reporting, to the virtual bus driver, the binary object store descriptor of the second USB device with the WebUSB platform capability descriptor removed.

16. The method of claim 15, further comprising:
monitoring requests to access the second USB device;
determining that a request to access the second USB device originated from a browser process; and
blocking the request.

17. One or more computer storage media storing computer executable instructions which when executed implement a method for managing WebUSB support for USB devices, the method comprising:
enumerating a USB device;
during enumeration, determining that the USB device includes a device descriptor that identifies a first version of a USB standard that the USB device supports;
modifying the device descriptor to report a second version of the USB standard, the second version being subsequent to the first version;
during enumeration, determining that the USB device does not provide a Microsoft OS feature descriptor that defines a compatible ID of WINUSB; and
reporting that the USB device provides a Microsoft OS feature descriptor that defines a compatible ID of WINUSB.

18. The computer storage media of claim 17, wherein a server-side agent modifies the device descriptor and reports that the USB device provides the Microsoft OS feature descriptor that defines the compatible ID of WINUSB.

19. The computer storage media of claim 17, wherein a client-side hook driver modifies the device descriptor and reports that the USB device provides the Microsoft OS feature descriptor that defines the compatible ID of WINUSB.

20. The computer storage media of claim 17, wherein the method further comprises:
during enumeration, determining that the USB device does not provide a WebUSB platform capability descriptor; and
reporting that the USB device provides a binary object store descriptor that includes a WebUSB platform capability descriptor.

* * * * *